(12) United States Patent
Jeong (10) Patent No.: US 10,555,655 B2
(45) Date of Patent: Feb. 11, 2020

(54) ROBOT CLEANER AND METHOD FOR CONTROLLING THE SAME

(71) Applicant: EVERYBOT INC., Seongnam-si, Gyeonggi-do (KR)

(72) Inventor: Hyun Gu Jeong, Bucheon-si (KR)

(73) Assignee: EVERYBOT INC., Seongnam-si (KR)

( * ) Notice: Subject to any disclaimer, the term of this patent is extended or adjusted under 35 U.S.C. 154(b) by 160 days.

(21) Appl. No.: 15/125,524

(22) PCT Filed: May 12, 2014

(86) PCT No.: PCT/KR2014/004236
§ 371 (c)(1),
(2) Date: Sep. 12, 2016

(87) PCT Pub. No.: WO2015/137561
PCT Pub. Date: Sep. 17, 2015

(65) Prior Publication Data
US 2017/0071435 A1 Mar. 16, 2017

(30) Foreign Application Priority Data
Mar. 11, 2014 (KR) .......................... 10-2014-0028605

(51) Int. Cl.
*A47L 11/40* (2006.01)
*A47L 11/282* (2006.01)

(52) U.S. Cl.
CPC ......... *A47L 11/4011* (2013.01); *A47L 11/282* (2013.01); *A47L 11/4008* (2013.01); *A47L 11/4038* (2013.01); *A47L 11/4061* (2013.01); *A47L 11/4066* (2013.01); *A47L 2201/04* (2013.01)

(58) Field of Classification Search
None
See application file for complete search history.

(56) References Cited

U.S. PATENT DOCUMENTS

| | | | |
|---|---|---|---|
| 2013/0000675 A1* | 1/2013 | Hong | A47L 9/009 134/18 |
| 2013/0241217 A1* | 9/2013 | Hickey | B60R 19/483 293/117 |
| 2014/0127975 A1* | 5/2014 | Roy | A47L 11/16 451/28 |

FOREIGN PATENT DOCUMENTS

| | | |
|---|---|---|
| KR | 10-2006-0105830 A | 10/2006 |
| KR | 10-1000178 B | 12/2010 |
| KR | 10-2012-0009927 A | 2/2012 |
| KR | 10-2013-0002218 A | 1/2013 |

* cited by examiner

*Primary Examiner* — Katelyn B Whatley
(74) *Attorney, Agent, or Firm* — Novick, Kim & Lee, PLLC; Sang Ho Lee (57) ABSTRACT

A method for controlling a robot cleaner includes: a step of controlling at least one of a first rotation member and a second rotation member to rotate depending on a traveling mode to travel the robot cleaner in a specific proceeding direction; a step of identifying whether or not an obstacle is detected from a sensor; and a step of setting a reference surface depending on the obstacle and controlling the first rotation member and the second rotation member to perform a wall movement pattern along the reference surface, in the case in which the obstacle is continuously detected.

9 Claims, 8 Drawing Sheets

ROBOT CLEANER AND METHOD FOR CONTROLLING THE SAME

CROSS-REFERENCE TO RELATED APPLICATION

This application is an U.S. national stage application of PCT application No. PCT/KR2014/004236 filed on May 12, 2014, which claims the priority and benefit of Korean Patent Application No. 10-2014-0028605 filed on Mar. 11, 2014, with the Korean Intellectual Property Office, the entire disclosure of which is hereby incorporated by reference.

BACKGROUND OF THE INVENTION

1. Field of the Invention

The present invention relates to a robot cleaner and a method for controlling the same, and more particularly, to a robot cleaner capable of performing dustcloth cleaning while being autonomously moved, and a method for controlling the same.

2. Description of the Related Art

In accordance with the development of an industrial technology, various apparatuses have been automated. As well known, a robot cleaner has been utilized as a device automatically cleaning a target zone to be cleaned by sucking foreign materials such as dust, and the like, from a surface to be cleaned or wiping the foreign materials on the surface to be cleaned while being spontaneously traveled within the target zone to be cleaned without being manipulated by a user.

Generally, the robot cleaner may include a vacuum cleaner performing cleaning using suction force by a power source such as electricity, or the like.

However, the robot cleaner including the vacuum cleaner as described above does not remove foreign materials, an ingrained stain, and the like, stuck to the surface to be cleaned. Therefore, recently, a robot cleaner capable of performing damp cloth mopping or dustcloth cleaning by including a dustcloth attached thereto has emerged.

However, a dustcloth cleaning scheme using a general robot cleaner is only a simple scheme of attaching the dustcloth, or the like, to a lower portion of an existing robot cleaner for vacuum cleaning, such that a foreign material removal effect is low and dustcloth cleaning is not efficiently performed.

Particularly, in the case of the dustcloth cleaning scheme using the general robot cleaner, the general robot cleaner is traveled using a moving scheme, an obstacle avoiding scheme, and the like, for an existing suction type vacuum cleaner. Therefore, even though dust, and the like, scattered on the surface to be cleaned is removed, foreign materials, and the like, stuck to the surface to be cleaned may not be easily removed.

In addition, in the case of the dustcloth attachment structure of the general robot cleaner, a frictional force between the general robot cleaner and the ground is increased due to a dustcloth surface, such that a separate thrust for moving a wheel is further required. Therefore, battery consumption is increased.

SUMMARY OF THE INVENTION

An object of the present invention is to provide a robot cleaner including a pair of rotation members to which dustcloth may be attached so as to effectively remove foreign materials, or the like, stuck to a surface to be cleaned, that may improve battery efficiency using torques of the rotation members as a power source of movement and may perform a rotation control for accomplishing effective dustcloth cleaning depending on a proceeding route and obstacle detection, and a method for controlling the same.

According to an exemplary embodiment of the present invention, a method for controlling a robot cleaner includes: a step of controlling at least one of a first rotation member and a second rotation member to rotate depending on a traveling mode to travel the robot cleaner in a specific proceeding direction; a step of identifying whether or not an obstacle is detected from a sensor; and a step of setting a reference surface depending on the obstacle and controlling the first rotation member and the second rotation member to perform a wall movement pattern along the reference surface, in the case in which a time in which the obstacle is detected continuously exceeds a predetermined time or more.

According to another exemplary embodiment of the present invention, a robot cleaner includes: a body unit to which a first rotation member and a second rotation member to which circular cleaners are fixed are formed to protrude toward a surface to be cleaned; a driving unit fixed into the body unit, driving the first rotation member in a first direction or a second direction, and driving the second rotation member in the first direction or the second direction; one or more sensors provided on outer side surfaces of the body unit and provided in order to sense an obstacle in the vicinity of the robot cleaner; and a control unit deciding whether or not the obstacle is detected from the sensors, and setting a reference surface depending on the obstacle and controlling the first rotation member and the second rotation member to perform a wall movement pattern along the reference surface in the case in which a time in which the obstacle is detected continuously exceeds a predetermined time or more.

Meanwhile, the method for controlling a robot cleaner may be implemented by a computer-readable recording medium in which a program that is to be executed in a computer is recorded.

According to an exemplary embodiment of the present invention, the robot cleaner may move while effectively removing the foreign materials, and the like, stuck to the surface to be cleaned using the torques of the pair of rotation members to which the dustcloth may be attached as the power source of the movement.

In addition, the battery efficiency may be improved using the torques of the rotation members as the power source of the movement, and the rotation control for accomplishing effective dustcloth cleaning may be performed depending on the proceeding route and the obstacle detection.

Meanwhile, according to an exemplary embodiment of the present invention, the number of sensors of the robot cleaner moving using the torques of the rotation members as the power source of the movement may be minimized, and the obstacle detection performance may be improved. Therefore, a problem that the robot cleaner is caught and does not proceed by the obstacle at the time of being moved may be solved, and a manufacturing cost required for attaching the sensors may be reduced.

DETAILED DESCRIPTION

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various devices including processors or functional blocks represented as concepts similar to the processors and shown in the accompanying drawings may be provided using hardware having capability to execute appropriate software as well as dedicated hardware. When the functions are provided by the processors, they may be provided by a single dedicated processor, a single shared processor, or a plurality of individual processors, and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

Figure 1:
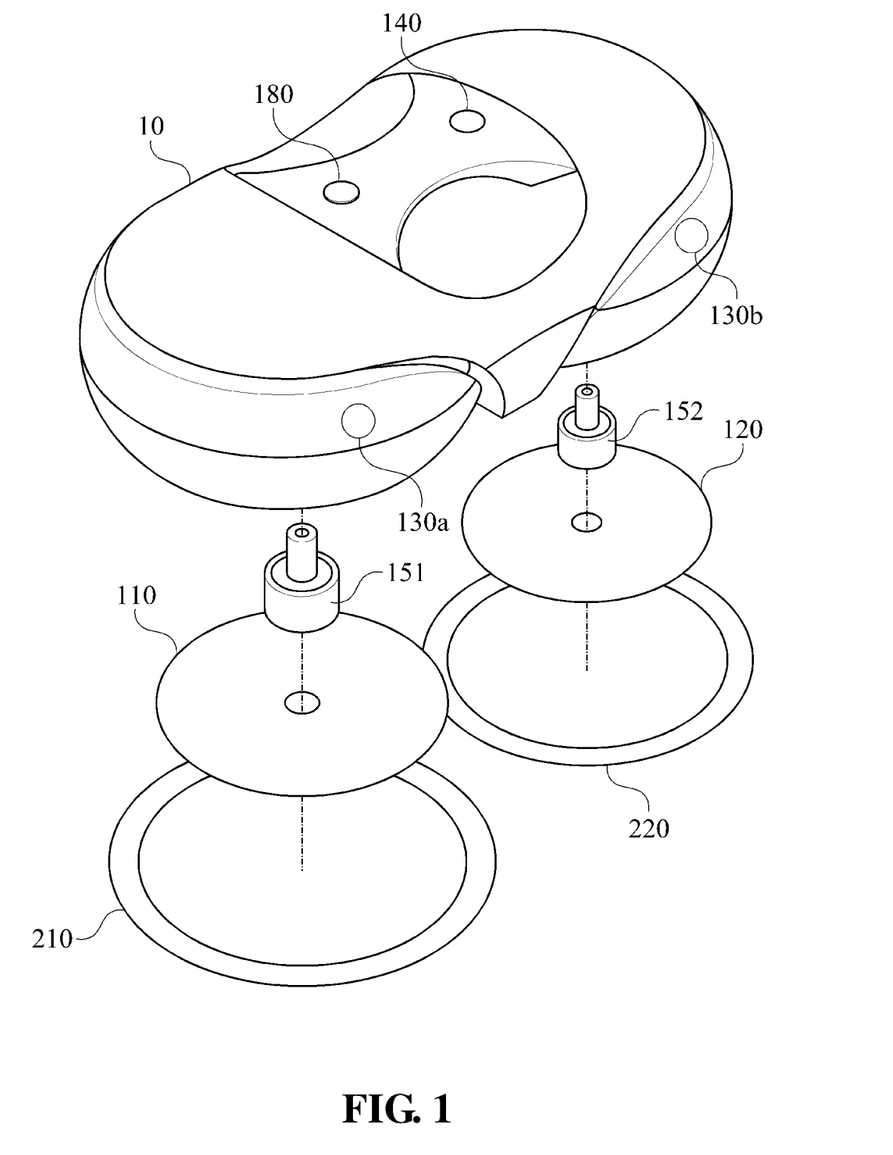
FIG. 1 is a view schematically illustrating an appearance of a robot cleaner according to an exemplary embodiment of the present invention.
Figure 2:
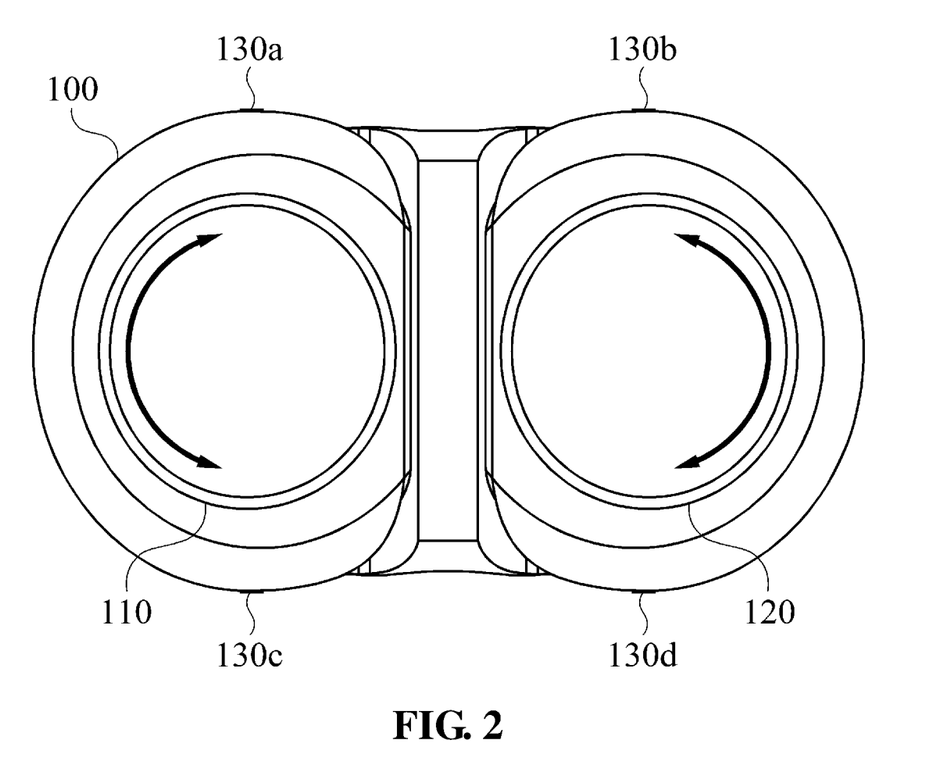
FIG. 2 is a bottom view illustrating a first rotation member and a second rotation member of the robot cleaner according to an exemplary embodiment of the present invention.
Figure 3:
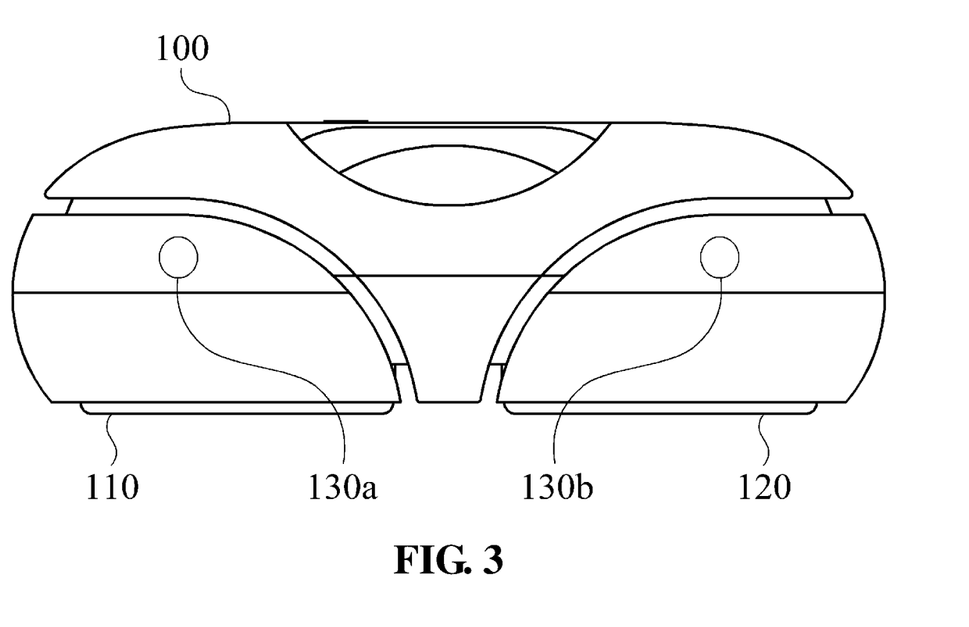
FIG. 3 is a side view for describing positions of sensors of the robot cleaner according to an exemplary embodiment of the present invention.

FIGS. 1 to 3 are views for describing a physical configuration of a robot cleaner according to an exemplary embodiment of the present invention.

In more detail, FIG. 1 is an exploded perspective view schematically illustrating a structure of a robot cleaner according to an exemplary embodiment of the present invention, FIG. 2 is a bottom view for describing a first rotation member and a second rotation member of the robot cleaner according to an exemplary embodiment of the present invention, and FIG. 3 is a side view for describing positions of sensors of the robot cleaner according to an exemplary embodiment of the present invention.

Referring to FIGS. 1 to 3, the robot cleaner 100 according to an exemplary embodiment of the present invention may be structurally configured to include a body 10, a first shaft 151 and a second shaft 152 coupled to a driving unit fixed to an inner portion of the body 10 and each formed toward a surface to be cleaned, a first rotation member 110 coupled to the first shaft 151 to thereby rotate, a second rotation member 120 coupled to the second shaft 152 to thereby rotate, one or more sensors 130a, 130b, . . . , provided on side surfaces and a central surface of the body 10, and an input unit 180 and a communication unit 140 provided on an upper end of the body 10.

Here, a first circular cleaner 210 and a second circular cleaner 220 may be each coupled to the first rotation member 110 and the second rotation member 120 each coupled to the first shaft 151 and the second shaft 152 to thereby rotate depending on a rotation motion.

The first rotation member 110 and the second rotation member 120 may be formed to protrude from the body 10 toward the surface to be cleaned, for example, toward a bottom surface, and may be formed so that the first circular cleaner 210 and the second circular cleaner 220 may be fixed thereto.

The first circular cleaner 210 and the second circular cleaner 220 may be formed of various fiber materials such as cloth that may wipe the surface to be cleaned, such as superfine fiber cloth, dustcloth, non-woven fabric, brush, and the like, so as to remove foreign materials stuck to the bottom surface through a rotation motion.

In addition, the first circular cleaner 220 and the second circular cleaner 220 may be fixed to the first rotation member 110 and the second rotation member 120 by a method of covering the first rotation member 110 and the second rotation member 120 with the first circular cleaner 210 and the second circular cleaner 220 or a method of using separate fixing means. For example, the first circular cleaner 210 and the second circular cleaner 220 may be attached and fixed to the first rotation member 110 and the second rotation member 120 by Velcro tapes, or the like.

In the robot cleaner 100 according to an exemplary embodiment of the present invention as described above, the first circular cleaner 210 and the second circular cleaner 220 rotate by the rotation motion of the first rotation member 110 and the second rotation member 120, thereby making it possible to remove foreign materials, and the like, stuck to the bottom through friction between the surface to be cleaned and the first and second circular cleaners 210 and 220. In addition, when frictional forces between the surface to be cleaned and the first and second circular cleaners 210 and 220 are generated, the frictional forces may be used as a power source of movement of the robot cleaner 100.

In more detail, in the robot cleaner 100 according to an exemplary embodiment of the present invention, the first rotation member 110 and the second rotation member 120 rotate, such that frictional forces with the surface to be cleaned is generated, and a movement speed and direction of the robot cleaner 100 may be adjusted depending on a magnitude and a direction of the sum of the frictional forces.

Particularly, although not illustrated in the accompanying drawings, rotation axes of the respective shafts 151 and 152 coupled to a pair of rotation members 110 and 120 may be formed to be inclined toward the center of the body 10. Therefore, the pair of rotation members 110 and 120 may be formed to be upwardly inclined from an outer side of the body 10 toward the center of the body 10. Therefore, in the case in which the pair of rotation members 110 and 120 rotate, relative frictional forces generated between the pair of rotation members 110 and 120 and the surface to be cleaned may be larger at the outer side of the body 10 than at the center of the body 10. Therefore, a movement speed and direction of the robot cleaner 100 may be controlled by the relative frictional forces generated by controlling the rotation of the pair of rotation members 110 and 120.

As described above, according to an exemplary embodiment of the present invention, a control is performed on movement speeds and directions of the rotation members 110 and 120 of the robot cleaner 100, thereby making it possible to perform effective dustcloth cleaning corresponding to a proceeding route and obstacle detection of the robot cleaner 100. Detailed control components will be described below.

Meanwhile, in an exemplary embodiment of the present invention, a sensor unit 130 may include a plurality of sensors provided at appropriate positions in order to detect front and rear obstacles. For example, the sensors 130*a*, 130*b*, 130*c*, and 130*d* may be provided on the side surfaces and the central surface of the body 10 in order to detect the obstacles. Particularly, the sensors 130*a*, 130*b*, 130*c*, and 130*d* may be provided in pairs at a front and a rear on the basis of a proceeding direction of the robot cleaner 100, and may be disposed at positions corresponding to the respective rotation members 110 and 120. According to an exemplary embodiment of the present invention, the robot cleaner 100 may detect the front obstacle based on information sensed in the sensor 130*a* and the sensor 130*b* or detect the rear obstacle based on information sensed in the sensor 130*c* and the sensor 130*d*, on the basis of the proceeding direction of the robot cleaner 100.

Figure 4:
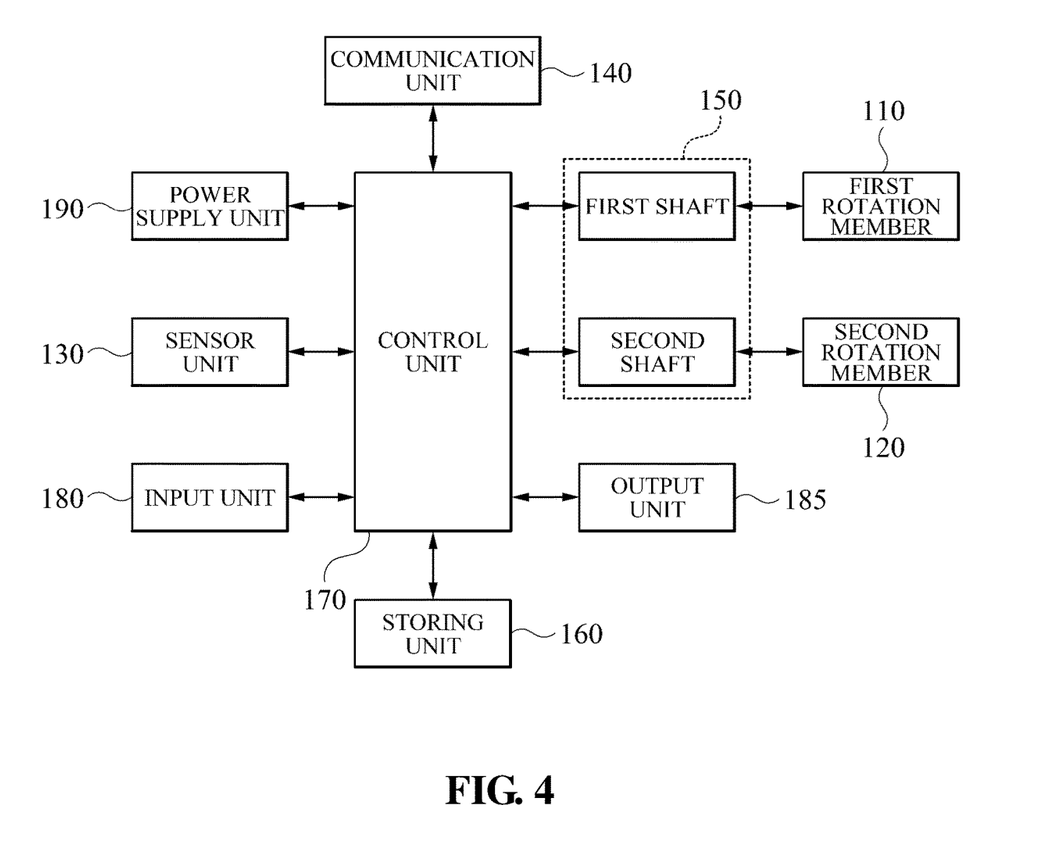
FIG. 4 is a block diagram illustrating components of a system for controlling a robot cleaner according to an exemplary embodiment of the present invention.

FIG. 4 is a block diagram illustrating components of a system for controlling a robot cleaner according to an exemplary embodiment of the present invention.

Referring to FIG. 4, the system for controlling a robot cleaner according to an exemplary embodiment of the present invention may be configured to include a sensor unit 130, a communication unit 140, a driving unit 150 for driving a first rotation member 110 and a second rotation member 120, a storing unit 160, a control unit 170, an input unit 180, an output unit 185, and a power supply unit 190.

The sensor unit 130 may include one or more sensors 130*a*, 130*b*, 130*c*, and 130*d* provided on the side surfaces and the central surface of the body 10 described above, and senses a surrounding state of the robot cleaner 100 to generate a sensing signal for controlling an operation of the robot cleaner 100. In addition, the sensor unit 130 may transfer the sensing signal detected depending on the surrounding state to the control unit 170. The sensor unit 130 may include an obstacle detecting sensor, a camera sensor, or the like, transmitting an infrared or ultrasonic signal to the outside and receiving a signal reflected from an obstacle.

The communication unit 140 may include one or more modules enabling wireless communication between the robot cleaner 100 and another wireless terminal or between the robot cleaner 100 and a network in which another wireless terminal is positioned. For example, the communication unit 140 may communicate with a wireless terminal, which is a remote controller. To this end, the communication unit 140 may include a near field communication module, a wireless Internet module, or the like.

An operation state, an operation scheme, or the like, the robot cleaner 100 may be controlled by a control signal received by the communication unit 140 as described above. An example of a terminal controlling the robot cleaner 100 may include a smart phone, a tablet, a personal computer, a remote controller, and the like, that may communicate with the robot cleaner 100.

The driving unit 150 generates control signals for rotating the first rotation member 110 and the second rotation member 120 depending on a control of the control unit 170. The driving unit 150 may include a first driver and a second driver. The first driver may generate a control signal for controlling rotation of the first shaft 151 coupled to the first rotation member 110, and the second driver may generate a control signal for controlling rotation of the second shaft 152 coupled to the second rotation member 120.

Meanwhile, the storing unit 160 may store a program for an operation of the control unit 170 therein, and temporarily store input/out data therein. The storing unit 160 may include at least one of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The input unit 180 generates input data for controlling an operation of the robot cleaner 100 by a user. The input unit 180 may be formed of a keypad, a dome switch, a touch pad (a resistive or capacitive touch pad), a jog wheel, a jog switch, or the like.

The output unit 185 is to generate an output related to a visual sense, an auditory sense, or the like. Although not illustrated, a display unit, a sound output module, an alarm unit, and the like, may be included in the output unit 185.

The control unit 170 usually controls a general operation of the robot cleaner 100. For example, the control unit 170 performs processes and controls related to cleaning time decision, cleaning route determination, traveling mode setting, obstacle avoidance, and the like.

Particularly, according to an exemplary embodiment of the present invention, the control unit 170 may control the robot cleaner 100 to be traveled in a specific proceeding direction by simultaneously or sequentially rotating the first rotation member 110 and the second rotation member 120 depending on a traveling mode.

In addition, the control unit 170 may decide whether or not an obstacle is detected from the signal sensed in the sensor unit 130 during a period in which traveling of the robot cleaner 100 is continued, and may rotate the first rotation member 110 and the second rotation member 120 in the same direction and at the same speed for a predetermined time when a time in which the obstacle is not detected exceeds a specific time or more.

When the first rotation member 110 and the second rotation member 120 rotate in the same direction and at the same speed due to the configuration as described above, the robot cleaner 100 may perform a rotation motion at the same place. The robot cleaner 100 may rotate at the same place depending on a rotation speed of the first rotation member 110 and the second rotation member 120.

Therefore, a direction in which a frictional force acts on the first rotation member of the robot cleaner 100 and a direction in which a frictional force acts on the second rotation member of the robot cleaner 100 are opposite to each other, such that the sum of the frictional forces may act as a torque for the robot cleaner 100.

In addition, the control unit 170 may arbitrarily adjust a rotation time in which the robot cleaner 100 rotates at the same place after the specific time, thereby changing a proceeding direction of the robot cleaner 100. Therefore, according to an exemplary embodiment of the present invention, even though the obstacle is not detected, in the case in which the time in which the obstacle is not detected exceeds the specific time or more, the robot cleaner 100 rotates at the same place to change a direction, thereby making it possible to escape from a case in which the robot cleaner 100 is caught and does not proceed by an obstacle that is not sensed. For example, the robot cleaner 100 according to an exemplary embodiment of the present invention may be in a state in which it does not move up a carpet, or the like, and is caught by the carpet, or the like. However, the rotation control as described above is performed, thereby making it possible to easily escape from the state described above without adding a separate sensor.

Meanwhile, in the case in which the obstacle is detected, the control unit 170 may control the rotation of the first rotation member and the second rotation member toward a direction for avoiding the obstacle depending on a position of the detected obstacle to perform a direction change, and may set a direction in which the obstacle is not detected to the proceeding direction.

In addition, the control unit 170 may include an advance mode setting unit selecting any one traveling mode of a first advance mode and a second advance mode.

The advance mode setting unit may select any one of the first advance mode and the second advance mode depending on speed setting of the robot cleaner or select any one of the first advance mode and the second advance mode depending on cleaning mode setting of the robot cleaner. The proceeding direction may be varied depending on a moving route determined by the control unit 170 or a moving route predetermined depending on a user input.

The control unit 170 may control at least one of the first rotation member and the second rotation member depending on the traveling mode selected as described above and the proceeding direction set as described above to travel the robot cleaner 100 in the first advance mode or the second advance mode specialized for the robot cleaner 100 and perform efficient cleaning.

In an exemplary embodiment of the present invention, in the case in which the first advance mode is selected, the control unit 170 may control the first rotation member 110 and the second rotation member 120 to rotate in different directions and at the same speed depending on the proceeding direction. In this case, a direction in which one end of the body 10 of the robot cleaner 100 moves by the frictional force between the first rotation member 110 and the surface to be cleaned may be the same as a direction in which the other end of the body 10 of the robot cleaner 100 moves by the frictional force between the second rotation member 120 and the surface to be cleaned. Therefore, in the case in which the first advance mode is selected, the control unit 170 may control the robot cleaner 100 to perform straight traveling in a specific direction.

Meanwhile, according to an exemplary embodiment of the present invention, in the case in which the second advance mode is selected, the control unit 170 may perform a control to sequentially and repeatedly perform a first step and a second step for a preset cleaning time, the first step being a step of controlling the first rotation member 110 to rotate at a constant first speed and in a second direction and controlling the second rotation member 120 to rotate at a second speed larger than the first speed and in the same direction as the second direction for a first time and the second step being a step of controlling the first rotation member 110 to rotate at the second speed and in a first direction different from the second direction and controlling the second rotation member 120 to rotate at the first speed and in the first direction when the first time elapses. Therefore, in the case in which the second advance mode is selected, the control unit 170 may control the robot cleaner to perform traveling while forming an S-shaped route in a specific direction. In this case, a movement speed may be slightly decreased as compared with the first advance mode, and obstacle detection performance and cleaning efficiency may be improved.

The power supply unit 190 receives external power or internal power by a control of the control unit 170 and supplies power required for operating the respective components.

Next, a method for controlling traveling of a robot cleaner 100 using the rotation control as described above will be described in more detail.

Figure 5:
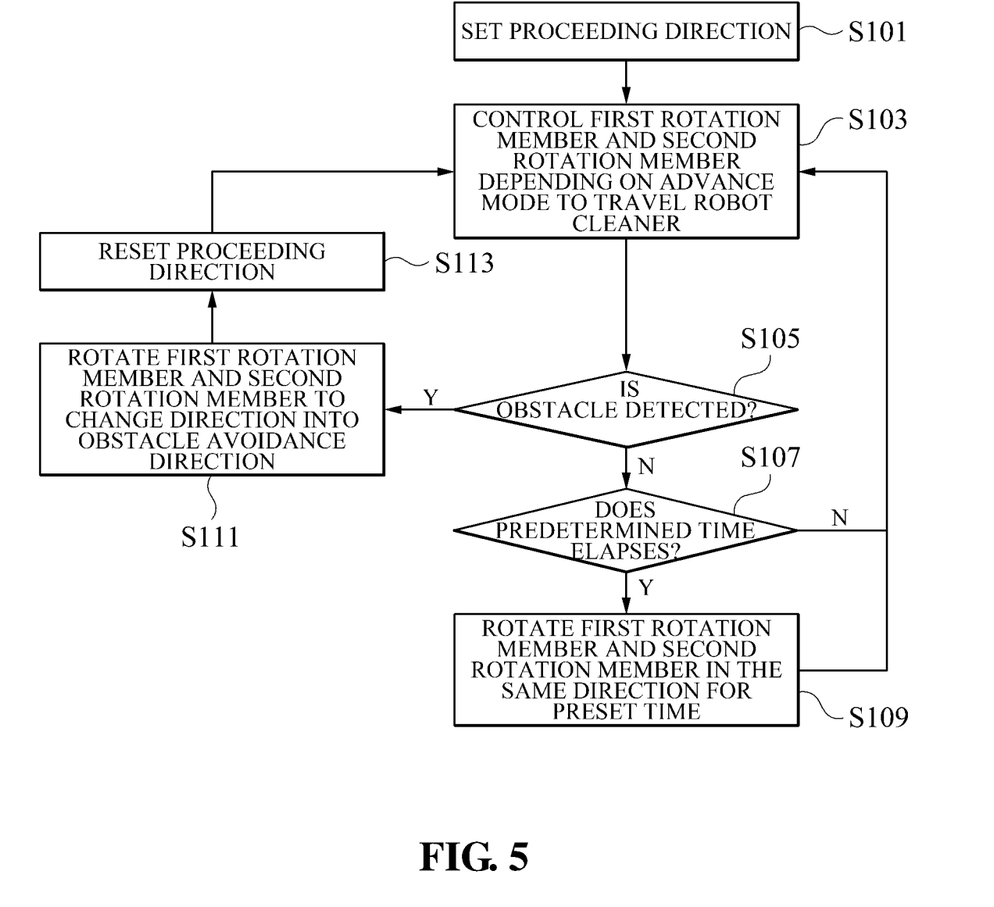
FIG. 5 is a flow chart illustrating a method for controlling a robot cleaner according to an exemplary embodiment of the present invention.

FIG. 5 is a flow chart illustrating a method for controlling a robot cleaner according to an exemplary embodiment of the present invention.

Referring to FIG. 5, the robot cleaner 100 sets a proceeding direction (S101), and controls the first rotation member 110 and the second rotation member 120 depending on an advance mode to start traveling (S103).

As described above, the control unit 170 may set the proceeding direction depending on a predetermined moving route, and select the advance mode to perform the traveling.

Then, the robot cleaner 100 decides whether or not an obstacle is detected (S105).

The control unit 170 may decide whether or not the obstacle is detected based on the sensing signals output from the plurality of sensors 130a, 130b, 130c, and 130d included in the sensor unit 130.

In addition, the control unit 170 may also decide whether or not the obstacle is detected using only sensing signals output from sensors corresponding to a proceeding direction of the robot cleaner 100 among the sensors of the sensor unit 130. For example, the control unit 170 may decide whether the obstacle is positioned in the proceeding direction based on sensing signals output from the sensor 130a and the sensor 130b positioned on one side surface on the basis of a relatively long side surface of the body 10.

In addition, in the case in which the obstacle is detected, the robot cleaner 100 controls the first rotation member 110 and the second rotation member 120 to change a direction of the robot cleaner into a direction in which it avoids the obstacle (S111), resets the proceeding direction to the changed direction (S113), and again starts traveling controlling the first rotation member and the second rotation member depending on the advance mode (S103).

The control unit 170 may measure a direction in which the obstacle is positioned and a distance up to the obstacle on the basis of the proceeding direction based on the sensing signals output from the sensor unit 130.

In addition, as a rotation control scheme in which the control unit 170 changes the direction of the robot cleaner into the direction in which the robot cleaner avoids the obstacle, there may be several schemes. For example, the control unit 170 may control rotation directions and speeds of the first rotation member 110 and the second rotation member 120 to be the same as each other, thereby controlling the robot cleaner to rotate at the same place in a direction that becomes distant from a direction in which the obstacle is detected for a predetermined time.

In addition, in the case in which the direction in which the obstacle is detected is relatively close to a specific rotation member, for example, the first rotation member 110, the control unit 170 may control the first rotation member 110 to rotate in an opposite direction to a current direction for a predetermined time in a state in which the rotation of the second rotation member 120 is stopped, thereby controlling the robot cleaner to rotate in a direction that become distant from the obstacle.

Further, in the case in which the obstacle is detected in front of both of the first rotation member 110 and the second rotation member 120, the control unit 170 may rotate both of the first rotation member 110 and the second rotation member 120 in an opposite direction to a current direction, thereby changing the proceeding direction into the opposite direction.

Further, the control unit 170 may select a specific direction except for the direction in which the obstacle is detected, and reset the specific direction to the proceeding direction. In this case, the specific direction may be a random direction except for the direction in which the obstacle is detected depending on a result of the direction change or a direction determined depending on the predetermined moving route.

Meanwhile, in the case in which the obstacle is not detected, the robot cleaner 100 decides whether or not a predetermined time elapses (S107). In the case in which the predetermined time does not elapse, the robot cleaner 100 continuously performs the traveling depending on the advance mode (S103).

However, in the case in which the predetermined time elapses, the robot cleaner 100 rotates the first rotation member 110 and the second rotation member 120 in the same direction for a preset time (S109).

As described above, the driving of the robot cleaner 100 depends on a torque of the rotation member, and a cleaner formed of cloth, such as dustcloth, or the like, may be attached to the rotation member. Therefore, in the case in which the robot cleaner 100 meets an obstacle having a height change of the surface to be cleaned or is traveled on a region in which a material of a bottom of the surface to be cleaned is changed, the robot cleaner 100 may be abnormally traveled. Therefore, in order to solve this problem, in the case in which the preset time or more elapses in a state in which the obstacle is not detected, the control unit 170 may control the rotation directions and speeds of the first rotation member 110 and the second rotation member 120 to be the same as each other, thereby controlling the robot cleaner to rotate at the same place.

The robot cleaner 100 according to an exemplary embodiment of the present invention rotates at the same place at a predetermined time period by the rotation control of the control unit 170 as described above, such that the robot cleaner 100 may more effectively detect the obstacle positioned in the vicinity of the robot cleaner 100 through the rotation and avoid the obstacle. In addition, in the case in which the robot cleaner 100 is caught at a specific position of the surface to be cleaned to be at a deadlock in which it is difficult to sense the obstacle, the robot cleaner 100 may escape from the deadlock through periodical rotation.

Hereinafter, a wall movement pattern according to another exemplary embodiment of the present invention will be described with reference to FIGS. 6 to 8.

Figure 6:
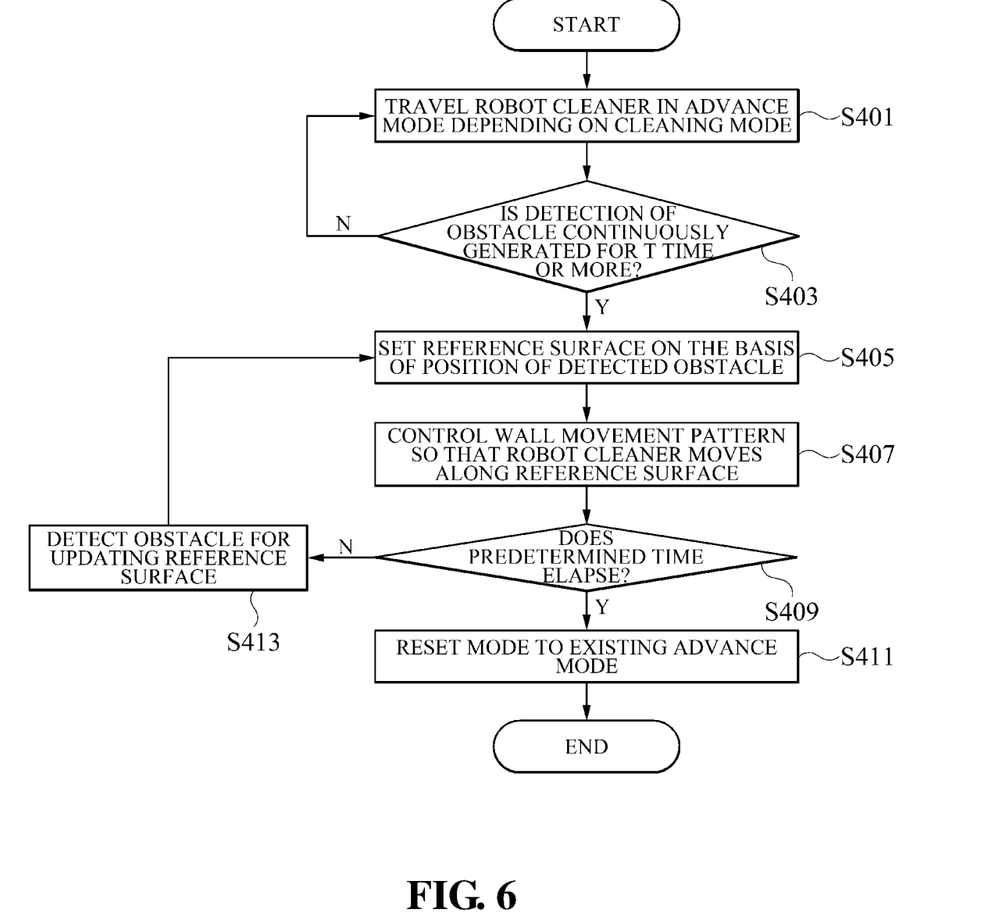
FIGS. 6 to 8 are views for describing a wall movement pattern according to an exemplary embodiment of the present invention.

FIG. 6 is a flow chart illustrating a method for controlling a robot cleaner according to another exemplary embodiment of the present invention.

Referring to FIG. 6, the robot cleaner 100 first performs traveling in an advance mode depending on a cleaning mode (S401).

As described above, the control unit 170 may set the first advance mode or the second advance mode depending on the cleaning mode, and control each of the first rotation member 110 and the second rotation member 120 to control movement of the robot cleaner 100 in the proceeding direction depending on the moving route. In addition, the control unit 170 may perform the control on the direction change described above in the case in which the obstacle is temporarily detected in the advance mode, and perform the control on the rotation at the same place described above in the case in which the obstacle is not detected for a predetermined time or more.

However, in the case in which the detection of the obstacle is continuously generated for a time T or more (S403), the robot cleaner 100 sets a reference surface on the basis of a position of the detected obstacle (S405), and performs a control on the wall movement pattern for moving along the set reference surface (S407).

According to an exemplary embodiment of the present invention, in the case in which a time in which the obstacle is detected continuously exceeds a predetermined time or more from the sensing signal of the sensor unit 130, the control unit 170 may set a reference surface depending on the position of the obstacle, and control the first rotation member and the second rotation member to perform the wall movement pattern along the reference surface, thereby performing the control on the wall movement pattern.

Then, in the case in which a predetermined time does not elapse after the control on the wall movement pattern starts (S409), the control unit 170 again performs detection of an obstacle for updating the reference surface (S413), and sets the reference surface on the basis of a position of the again detected obstacle (S405). When the obstacle is continuously detected from after the wall movement pattern starts until before a predetermined time elapses, the control unit 170 may update the reference surface depending on a position of the obstacle.

Therefore, the control unit 170 may decide whether or not another obstacle is detected from a sensor corresponding to the preceding direction of the robot cleaner during a period in which the wall movement pattern is performed, and reset or update the reference surface on the basis of a position of another obstacle in the case in which a time in which another obstacle is detected continuously again exceeds a predetermined time or more.

In addition, the control unit 170 may control the first rotation member 110 and the second rotation member 120 to perform the wall movement pattern along the updated reference surface.

Then, in the case in which the predetermined time elapse after the control on the wall movement pattern starts, the robot cleaner 100 is reset to the existing advance mode, and returns to traveling on the advance mode like S401 (S411).

That is, in the case in which the predetermined time or more elapses after the control on the wall movement pattern starts, the control unit 170 may return to the traveling mode and control the first rotation member 110 and the second rotation member 120 to simultaneously or sequentially rotate, thereby traveling the robot cleaner in the specific proceeding direction.

The robot cleaner 100 according to an exemplary embodiment of the present invention may perform rotation cloth mopping along a wall portion that is not wiped well at the time of general cleaning through the control on the wall movement pattern as described above to more clearly remove a pollutant, and perform the wall movement pattern even at a portion that is decided to be a rough road due to continuous detection of the obstacle to easily escape from the rough road without significantly deviating from a proceeding route and region by a random scheme, or the like.

Figure 7:
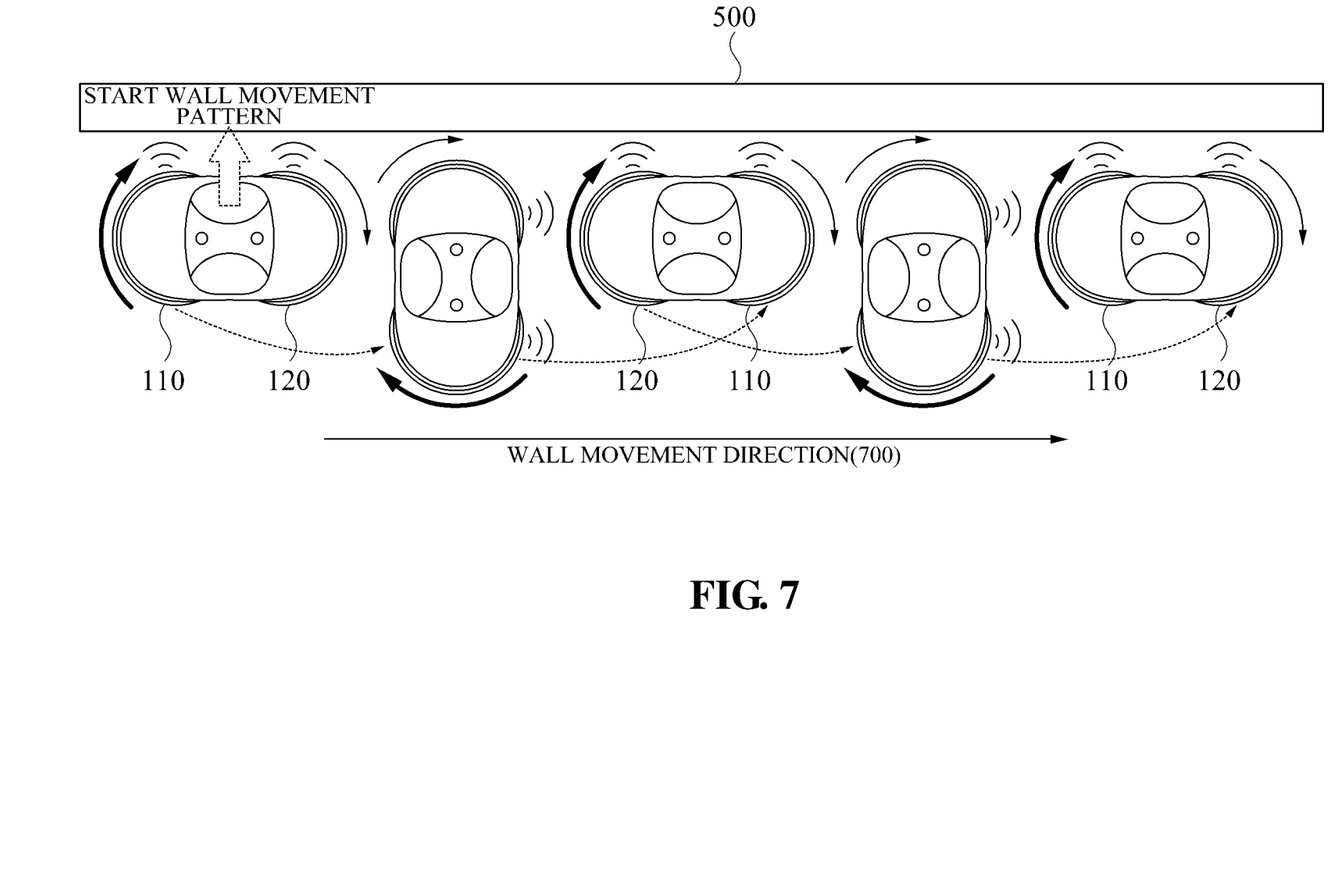

FIG. 7 is a view for describing a wall movement pattern performed through the control on rotation of the robot cleaner 100 according to an exemplary embodiment of the present invention as described above.

As illustrated in FIG. 7, the robot cleaner 100 may decide that it is positioned in the rough road and start the wall movement pattern, in the case in which a first obstacle such as a wall sensed depending on the existing proceeding direction is continuously detected for a predetermined time or more.

Particularly, for the purpose of the wall movement pattern, the control unit 170 may perform setting of a first reference surface 500. The setting of the first reference surface 500 may be determined depending on a position of the first obstacle sensed from the sensor unit 130.

For example, as illustrated in FIG. 7, in the case in which the first obstacle is detected for the predetermined time or more from all of a plurality of sensors corresponding to the proceeding direction of the robot cleaner 100, any one of both directions perpendicular to the proceeding direction and extended from the position of the first obstacle detected by the sensors may be set to the first reference surface.

Meanwhile, a step in which the robot cleaner 100 performs the wall movement pattern will be described in more detail below with reference to FIG. 7.

First, the control unit 170 may determine a wall movement direction 700 depending on the set first reference surface 500. The wall movement direction may be determined to be any one of both directions that are in parallel with the first reference surface 500.

In addition, the control unit 170 may determine rotation directions of the rotation members for moving the robot cleaner depending on the wall movement direction. As illustrated in FIG. 7, a rotation direction of the first rotation member 110 for moving the robot cleaner in the wall movement direction 700 may be determined to be a clockwise direction, that is, a second direction, in the case in which the proceeding direction is at the 12 o'clock position.

Therefore, the control unit 170 may select the first rotation member 110 depending on the wall movement direction 700 and control the first rotation member 110 to be rotation-traveled in the above-mentioned rotation direction at a speed higher than that of the second rotation member 120, thereby controlling the robot cleaner 100 to rotate to allow an opposite surface to be directed toward the first reference surface 500.

Meanwhile, in the case in which the robot cleaner is rotation-traveled depending on the rotation of the first rotation member 110 to again arrive at the first reference surface 500, the control unit 170 may control the second rotation member 120 to rotate at a speed higher than that of the first rotation member 110. A rotation direction is the same as the second direction determined previously.

The rotation and the rotation speeds of the first rotation member 110 and the second rotation member 120 as described above are sequentially and repeatedly controlled, such that the robot cleaner 100 may perform efficiently automatic dustcloth cleaning depending on the wall movement pattern on the basis of the first reference surface 500 toward the wall movement direction 700.

Figure 8:
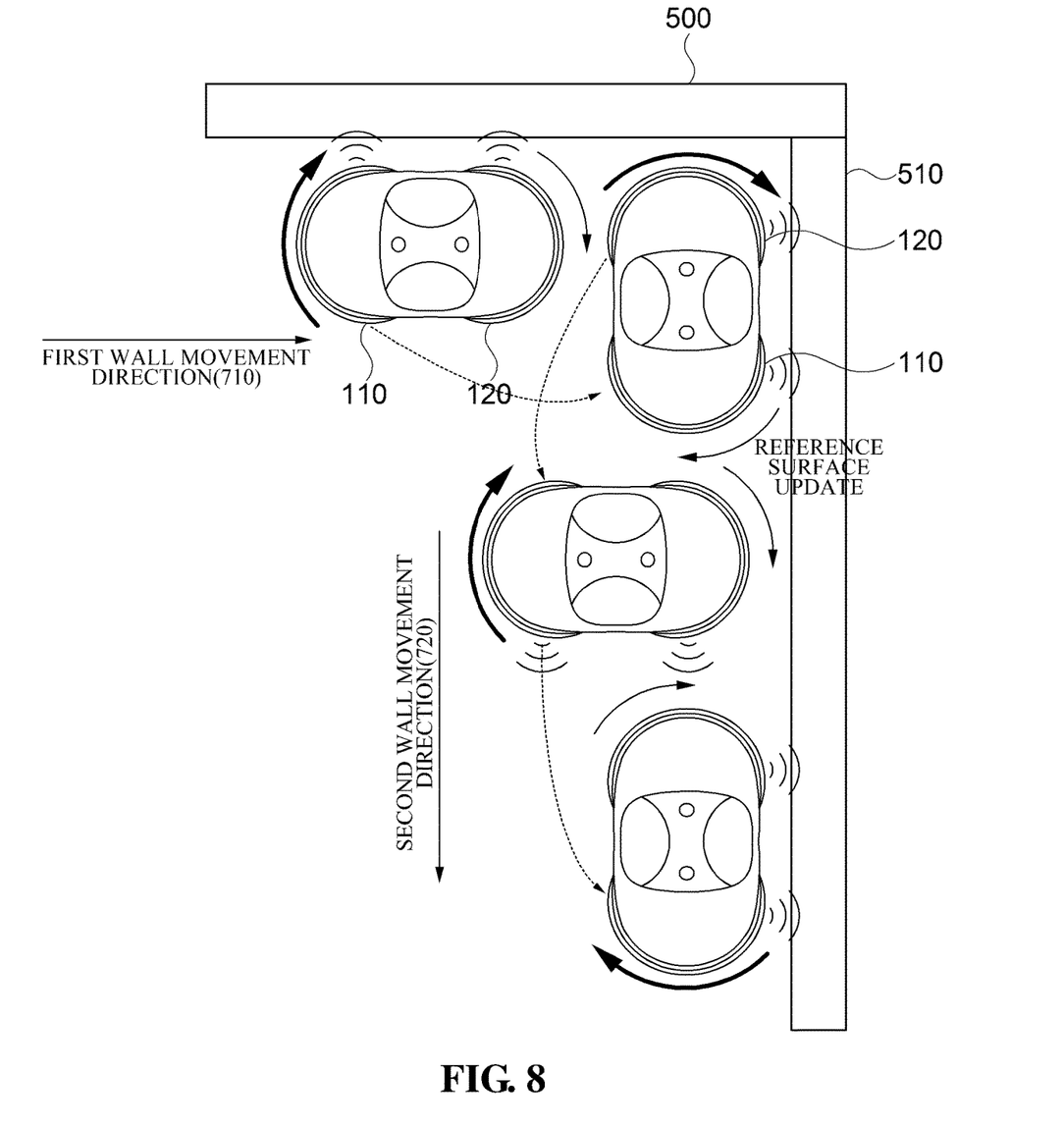

Meanwhile, FIG. 8 illustrates movement of a robot cleaner by a method for controlling a robot cleaner according to another exemplary embodiment of the present invention.

According to the exemplary embodiment of the present invention described above, the control unit 170 of the robot cleaner 100 may confirm whether or not the obstacle is detected even after the wall movement pattern starts, thereby continuously updating the reference surface. Particularly, the reference surface is updated, such that the wall movement pattern may be maintained even at a corner portion as illustrated in FIG. 8.

For example, the control unit 170 may newly detect a second obstacle positioned on a second reference surface 510 in a state in which it accelerates rotation of the first rotation member 110 in a first wall movement direction 710 to control the robot cleaner 100 to move along a first reference surface 500.

In addition, in the case in which the second obstacle is continuously detected for a predetermined time or more, the control unit 170 may update the reference surface and reset a second wall movement direction 720 on the basis of the updated second reference surface 120 to accelerate rotation of the second rotation member 510 corresponding to the second wall movement direction. Therefore, according to another exemplary embodiment of the present invention, the robot cleaner 100 may flexibly perform traveling depending on the wall movement pattern without being affected by the obstacle even at a terrain such as a wall edge, corner, or the like.

As described above, the present invention may provide a robot cleaner including the pair of rotation members to which the dustcloth may be attached so as to effectively remove the foreign materials, stuck to the surface to be cleaned, that may improve battery efficiency using torques of the rotation members as a power source of movement and may perform the rotation control depending on the traveling mode for accomplishing effective dustcloth cleaning depending on the proceeding route and the obstacle detection, and a method for controlling the same.

Meanwhile, the method of controlling a robot cleaner according to various exemplary embodiments of the present invention described above may be implemented by program codes and be provided in the respective servers or apparatuses in a state in which it is stored in various non-transitory computer-readable media.

The non-transitory computer-readable medium is not a medium that stores data therein for a while, such as a register, a cache, a memory, or the like, but means a medium that semi-permanently stores data therein and is readable by a device. In detail, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A method for controlling a robot cleaner including a first rotation member and a second rotation member respectively rotating around a first shaft and a second shaft and having cleaners fixed thereto, comprising:
controlling at least one of the first rotation member and the second rotation member to rotate depending on a traveling mode to drive the robot cleaner in a proceeding direction;
identifying whether or not an obstacle is detected by a sensor while the robot cleaner travels; and
setting a first reference surface based on a position of the obstacle and performing a wall movement pattern along the first reference surface while the robot cleaner travels performing one-way rotation and performing mopping with the cleaners, when the obstacle is continuously detected,
wherein the step of performing the wall movement pattern comprises:
a first step of controlling the first rotation member and the second rotation member to rotate in the same direction to allow one surface of the robot cleaner to be directed toward the first reference surface;
a second step of controlling the first rotation member and the second rotation member to rotate in the same direction equal to that of the first step to allow another surface of the robot cleaner opposite to the one surface of the robot cleaner to be directed toward the first reference surface; and
sequentially and repeatedly performing the first step and the second step.

2. The method of claim 1, further comprising:
deciding whether or not a second obstacle is detected by a sensor in the proceeding direction of the robot cleaner when the wall movement pattern is performed; and
setting a second reference surface depending on the second obstacle and performing the wall movement pattern along the second reference surface, when a time duration in which the second obstacle is continuously detected exceeds a predetermined time duration.

3. The method of claim 1, wherein the step of setting the first reference surface includes a step of setting one of both directions perpendicular to the proceeding direction for the first reference surface when the obstacle is continuously detected by a plurality of sensors in the proceeding direction.

4. The method of claim 1, further comprising a step of returning to the traveling mode and controlling at least one of the first rotation member and the second rotation member to rotate, thereby driving the robot cleaner in the proceeding direction, when a predetermined time duration elapses after the wall movement pattern starts.

5. The method of claim 1, wherein the robot cleaner performs the one-way rotation continuously in the step of performing the wall movement pattern.

6. The method of claim 5, wherein, in the first step, one of the first rotation member and the second rotation member is selected and controlled to rotate at a speed higher than that of the other rotation member, and, in the second step, the other rotation member is controlled to rotate at a speed higher than that of the selected rotation member when the robot cleaner is rotation-traveled depending on the rotation of the selected rotation member to arrive at the first reference surface.

7. The method of claim 1, wherein the step of controlling at least one of the first rotation member and the second rotation member to rotate depending on the traveling mode includes:
when a first advance mode is selected as the traveling mode, controlling the first rotation member to rotate in a first direction and controlling the second rotation member to rotate in a second direction different from the first direction, depending on the proceeding direction;
when a second advance mode is selected as the traveling mode, controlling a speed and a direction of the first rotation member to be a first speed and the second direction and controlling a speed and a direction of the second rotation member to be a second speed larger than the first speed and the second direction for a first time duration, depending on the proceeding direction;
controlling a speed and a direction of the first rotation member to be the second speed and the first direction different from the second direction and controlling a speed and a direction of the second rotation member to be the first speed and the first direction for a second time duration when the first time duration elapses; and
sequentially and repeatedly performing the last two steps for a preset cleaning time duration,
wherein the robot cleaner travels following a S-shaped route in the proceeding direction in the second advance mode.

8. The method of claim 1, further comprising a step of controlling at least one of the first rotation member and the second rotation member depending on a position of the obstacle to perform a direction change, when the obstacle is detected by at least one of four sensors which are disposed in pairs at a front surface and a rear surface of the robot cleaner on the basis of the proceeding direction, and are disposed at positions corresponding to the respective rotation members.

9. A non-transitory computer-readable recording medium in which a program for executing the method for controlling a robot cleaner of claim 1 in a computer is recorded.

* * * * *